(12) United States Patent
Leckschat et al.

(10) Patent No.: US 6,611,595 B1
(45) Date of Patent: Aug. 26, 2003

(54) METHOD FOR GENERATING MEASURING SIGNALS FOR MEASURING TRANSMISSION PROPERTIES OF TRANSMISSION LINKS MUTUALLY INFLUENCING ONE ANOTHER WITH CROSSTALK IN TELECOMMUNICATIONS SYSTEMS, PARTICULARLY OF HANDSFREE EQUIPMENT

(75) Inventors: Dieter Leckschat, Bocholt (DE); Karl-Heinz Pflaum, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/380,348

(22) PCT Filed: Mar. 5, 1998

(86) PCT No.: PCT/DE98/00659

§ 371 (c)(1),
(2), (4) Date: Aug. 30, 1999

(87) PCT Pub. No.: WO98/39855

PCT Pub. Date: Sep. 11, 1998

(30) Foreign Application Priority Data

Mar. 6, 1997  (DE) ........................ 197 09 203

(51) Int. Cl.[7] ............... H04M 1/76; H04M 7/00; H04M 9/00; H04M 3/00
(52) U.S. Cl. ............... 379/417; 379/418; 379/420.04
(58) Field of Search ............... 379/1.01, 12, 22, 379/22.02, 27.01, 31, 27.02, 27.03, 417, 418, 420.02, 420.03, 420.04

(56) References Cited

FOREIGN PATENT DOCUMENTS

| DE | 34 14452 C1 | 10/1985 |
| DE | 42 02 677 C1 | 9/1993 |

OTHER PUBLICATIONS

H. W. Gerlich, "A measurement technique to determine the transfer characteristics of hands–free telephones", Signal Processing, vol. 27, No. 3, pp. 281–300 (1992).

"Integrated Services Digital Network (ISDN); Technical characteristics of telephony terminals, Part 3: Pulse Code Modulation (PCM) A–law, loudspeaking and handsfree telephony", European Telecom. Standards Inst., pr 1–ETS 300 245–3, Nov. 1994.

F. Kettler, "Neue Messmethodik zur Bestimmung der Übertragungseigenschaften von Sprachechokompensatoren im Fernsprechnetz für Einzelmessungen und Tandemschaltungen", Forschritte der Akustik—DAGA 93, Bad Honnef, DPG GmbH, pp. 932–935.

"Transmission Characteristics of Hands–Free Telephones", ITU–Druckschrift, vol. V, pp. 64–71 (Melbourne, 1988).

*Primary Examiner*—Binh Tieu
(74) *Attorney, Agent, or Firm*—Bell Boyd & Lloyd LLC

(57) ABSTRACT

In order to be able to measure the transmission properties of transmission links mutually influencing one another with crosstalk in electrical message systems, particularly of handsfree equipment (FSE) such that the measurement is not falsified by occurring crosstalk influences, measuring signals that are essentially orthogonal are generated in the time or frequency domain in the measuring system (MS) from respectively at least two voice or test signals.

7 Claims, 7 Drawing Sheets

METHOD FOR GENERATING MEASURING SIGNALS FOR MEASURING TRANSMISSION PROPERTIES OF TRANSMISSION LINKS MUTUALLY INFLUENCING ONE ANOTHER WITH CROSSTALK IN TELECOMMUNICATIONS SYSTEMS, PARTICULARLY OF HANDSFREE EQUIPMENT

BACKGROUND OF THE INVENTION

The present invention is directed to a method for generating measuring signals for measuring the transmission properties of handsfree telecommunications devices. Handsfree equipment in telephones are electrical message systems comprising specific transmission links for voice transmission wherein the transmission links are mutually influenced by crosstalk. The possibility of being able to "talk handsfree" with a telephone significantly enhances the operating comfort of a telephone and the quality of a telephone call. Handsfree devices enable call situations like those that occur in natural conversation between talking parties and allow a significantly greater freedom of movement and action of the person speaking handsfree. Voice-controlled signal processing mechanisms are utilized in order, on the one hand, to get control of the discussion and listening-in conditions that clearly deteriorate compared to ordinary handset-bound telecommunication and, on the other hand, to minimize the risk of occurring feedback. As is known, the voice-controlled signal processing in handsfree telephones ensues by 1) voice-dependently switched attenuations in the respective transmission and reception paths (attenuation control of the transmission and reception paths; principle of the level scale),
2) dynamic compression methods,
3) frequency-selective level scales,
4) decorrelation of the transmission and reception signals, and
5) adaptive compensation of acoustic echos.

Over and above this, the phenomenon of double talk is a critical feature of handsfree devices. The remote subscribers communicating with one another can thereby talk simultaneously. Of the aforementioned methods employed in handsfree devices for signal processing, adaptive compensation of acoustic echos (constructing adaptive echo compensators) in handsfree devices especially leads to a considerably reduced attenuation boost of the respectively employed level scale. Double talk only becomes possible as a result thereof because, transmission and reception paths are simultaneously active on principle. However, the utilization of echo compensators does not yet assure an unproblematical double talk mode because the adaption algorithms that are employed react more or less sensitively to changes in the room (place at which the handsfree telephone is put) and disturbances due to double talk phases. Moreover, the finite adaption speed may result in a disturbing increase or too slow a decrease of the echos under certain circumstances. It is precisely the double talk occurring in handsfree devices that is greatly deteriorated by the aforementioned signal processing mechanisms. So that true-to-life conversations (acquisition of the real double talk call situation) can be realized with the handsfree devices, the auditively relevant parameters must, on the one hand, be extracted, and the instrumentally measurable, technical parameters that describe the handsfree device must be acquired. Instrumentally measurable parameters for characterizing the conversation parameters of a handsfree device are not contained in measurement rules currently under discussion—such as, for example, the publication prI-ETS 300-245-3, Part 3; PCM A-Law, Loudspeaking and Handsfree Telephony, Stockholm, November 1994 (approval regulation). No measurements whatsoever are specified either for the double talk parameters or for the attenuation control of the two transmission paths (transmission and reception paths). In order to nonetheless be able to make statements at all with respect to the conversation parameters of handsfree devices, it is at least necessary that, first, the attenuation boost realized in a handsfree device designed in conformity with the indicated approval regulation and, second, the attenuation distribution on the two transmission paths of the handsfree device in the quiescent condition are known. Neither statements that characterize the behavior of the handsfree device during a double talk event nor farther-reaching analyses of the transmission quality during the double talk event are possible with these two parameters because other technical parameters such as, for example, the prioritization of voice direction, switching times, blocking times, etc., play a part therein. In order to acquire the behavior of voice-controlled devices quite generally dependent on the time and level conditions of the two input signals, the publication *Fortschritte der Akustik*—DAGA 1993, Bad Honnef, DPG GmbH, pages 932–935; F. Kettler, "Neue Messmethodik zur Bestimmung der Übertragungseigenschaften von Sprachechokompensatoren in Fernsprechnetz für Enzelmessungen und Tandemschaltungen" discloses that two "composite source" signals with different cycle durations be employed. A suitable simulation and analysis of a time segment is thereby possible, whereby the two signals are simultaneously fed in (true double talk). Whether one voice path is prioritized, whether both voice paths are attenuated in alternation or, for example, whether a fixed attenuation distribution of both paths during double talk is present can be determined from the transmitted sequence.

FIG. 1 shows a measuring arrangement MA constructed according to ITU (International Telecommunication Union) publication Volume V—Recommendation P.34, Melbourne, 1988, pages 64 through 71, particularly Ch. 6, for measuring the transmission properties of a handsfree device FSE or a handsfree telephone FST in the "double talk" call situation. To this end, the handsfree device FSE is connected to a handsfree loudspeaker FL in a transmission direction (transmission path) via a first amplifier V1. In a reception direction (reception path), a handsfree microphone FM is connected to the handsfree device FSE via a second amplifier V2. Given the illustrated measuring arrangement MA, the double talk call situation occurring during handsfree calling is achieved in that an "artificial ear" KO and an "artificial mouth" KM are allocated to the handsfree loudspeaker FL and to the handsfree microphone FM, respectively, for simulating the handsfree conditions. The measuring arrangement MA also contains a measuring system MS in order to be able to acquire transmission properties of the handsfree device FSE. For simulating the real handsfree conditions, this measuring system MS supplies the handsfree device FSE with, first, a "remote" first transmission signal (measured signal) $SS_1$ via a transmission/reception duplexer SEW preceding the handsfree device FSE that proceeds via the handsfree loudspeaker FL to the "artificial ear" KO and, second, supplies it with a "near" second transmission signal (measured signal) $SS_2$ via the "artificial mouth" KM and the handsfree microphone FM. In the present case, the signals $SS_1$, $SS_2$ are preferably selected such that their properties correspond to those of a natural voice signal (for example, crest factor, envelope, spectral composition, etc.).

The measurement of the transmission properties of the handsfree device FSE is implemented in the measuring system MS. To that end, the signals $SS_1$, $SS_2$ sent from the measuring system MS are compared to a first reception signal $ES_1$ received by the measuring system MS via the "artificial ear" KO and to a second reception signal $ES_2$ received by the measuring system MS via the transmission/reception duplexer SEW.

Analogous to the real handsfree conditions, the known crosstalk phenomenon occurs in the present measuring arrangement due to the infeed of the signals $SS_1$, $SS_2$. This crosstalk is expressed therein that a first crosstalk signal $\ddot{U}S_1$ related to the first transmission signal SS1 (for example, due to measuring arrangement and signal propagation properties) proceeds into the handsfree microphone FM in addition to the second transmission signal $SS_2$, and that a second crosstalk signal $\ddot{U}S_2$ related to the second transmission signal $SS_2$ (for example, due to measuring arrangement and signal propagation properties) proceeds into the "artificial ear" KO in addition to the first transmission signal $SS_1$. However, the measurement of the transmission properties of the handsfree device FSE is falsified by this crosstalk (undesired effect). Since crosstalk is fundamentally unavoidable in handsfree calling, efforts have therefore been made to acquire the influences of the crosstalk in order to be able to take the results resulting therefrom into consideration in the construction of the handsfree devices.

Given extremely simply constructed handsfree devices, wherein a frequency-independent level scale is employed, the measurement of the transmission properties of the handsfree device FSE can be undertaken with two mono-frequency signals differing in frequency.

When, however, telephones with modern handsfree devices (adaptive filter, dynamic characteristics matching, noise suppression, etc.) are to be measured, then the signals must have the properties of natural speech (for example, crest factor, envelope, spectral composition, etc.) both in the time domain as well as in the frequency domain.

SUMMARY OF THE INVENTION

An object of the present invention is to generate measuring signals for measuring systems for measuring the transmission properties of transmission links that mutually influence one another due to crosstalk, particularly of handsfree devices, such that the measurement of the transmission properties is not falsified by occurring crosstalk influences.

This object is achieved in accordance with the invention in a method of generating a plurality k of source signals s;

defining a $(k-n+1)^{th}$ source signal length $x_{k-n+1}$ of a $(k-n+1)^{th}$ source signal $S_{k-n+1}$ with $x_{k-n+1}$ signal parts $$a_{1_{k-n+1}}, a_{2_{k-n+1}}, a_{3_{k-n+1}} \ldots a_{x_{k-n+1}-1}, a_{x_{k-n+1}},$$

said source signal length x being x 0, and said coefficient n being n {2 ... k};

defining a $k^{th}$ source signal length $x_k$ of a $k^{th}$ source signal $s_k$ with $x_k$ signal parts $$a_{1_k}, a_{2_k}, a_{3_k} \ldots a_{x_k-1}, a_{x_k};$$

calculating a measuring signal length m as m=n'm', said n being n' 0 and said m' being $m' = 2^{ent((ld(max\{x_{k-n+1}, x_k\}))+0.5)}$;

lengthening said $(k-n+1)^{th}$ source signal $s_{k-n+1}$ to said measuring signal length m by attaching $m-x_{k-n+1}$ zeros to an end of said $(k-n+1)^{th}$ source signal $s_{k-n+1}$;

lengthening said $k^{th}$ source signal $s_k$ to said measuring signal length m by attaching $m-x_k$ zeros to an end of said $k^{th}$ source signal $s_k$; and modifying said lengthened $(k-n+1)^{th}$ source signal $s_{k-n+1}$, and said lengthened $k^{th}$ source signal $s_k$ such that said $(k-n+1)^{th}$ source signal $s_{k-n+1}$ and said $k^{th}$ source signal $s_k$ being essentially orthogonal.

The idea underlying the invention is comprised therein that measuring signals (for example, the transmission signals SS1, SS2 of FIG. 1) that are essentially orthogonal are generated from respectively at least two voice or test signals ("k=2" source signals) in the time or frequency domain in the measuring system for measuring the transmission properties of transmission links that mutually influence one another due to crosstalk, particularly of handsfree devices. The remaining properties of the measuring signals are defined by the properties of the voice or test signals employed. Preservation of the properties is important in order to be able to investigate the dynamic behavior of transmission links that mutually influence one another due to crosstalk, particularly the handsfree devices, with real voice signals or specific test signals.

The orthogonality relationship is thereby not used in the mathematically exact sense, i.e. two vectors x, y of a Euclidean vector space V are orthogonal exactly when (x, y)=0 applies, but in a version de-intensified to finite precision: two vectors x, y of a Euclidean vector space V are orthogonal when—analogous to claim 2—|x, y|<<|x| |x, y|<<|y| apply.

The object of the invention is also achieved in a device having a measuring system operating according to the method.

DETAILED DESCRIPTION OF THE INVENTION

Figure 1:
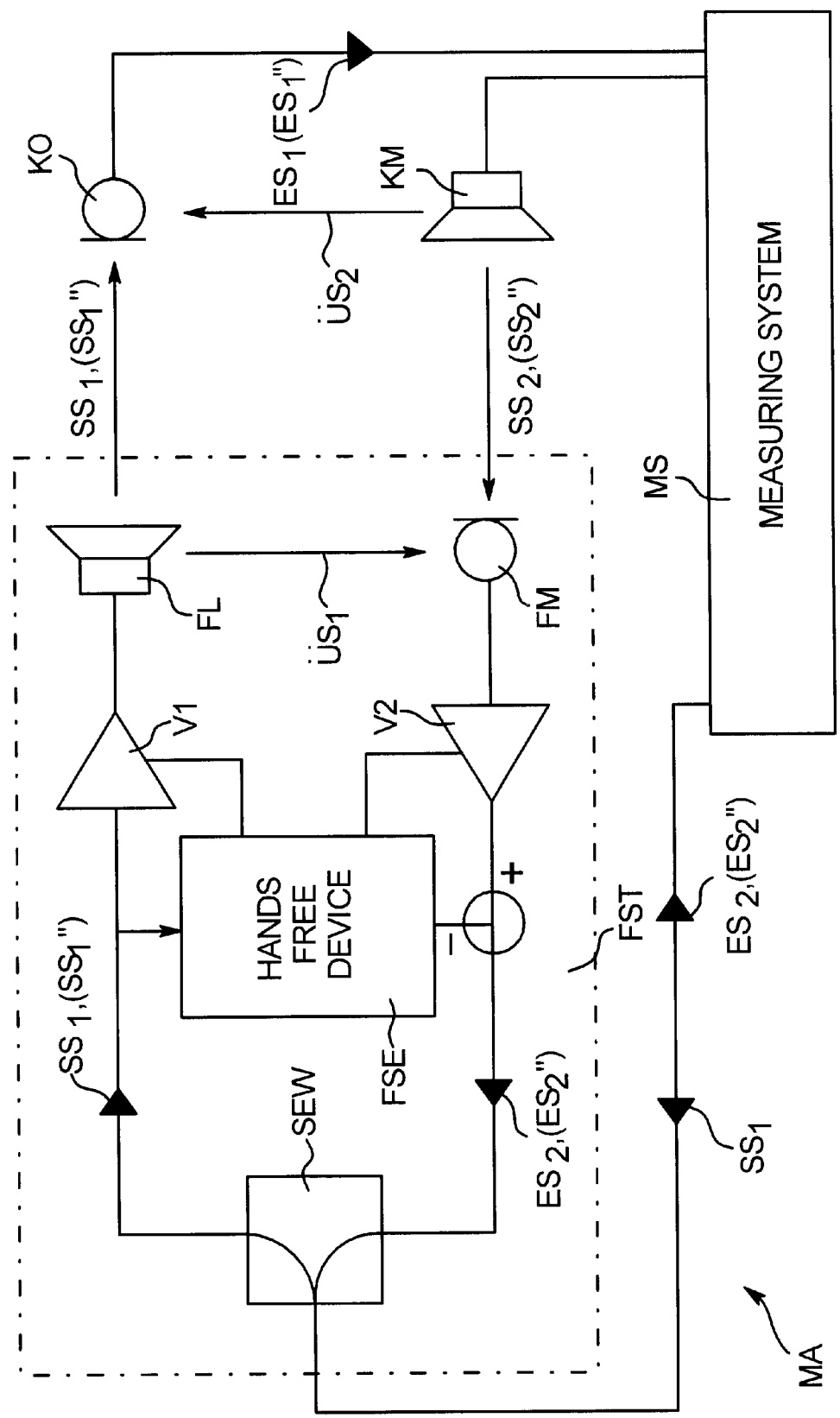
FIG. 1 is a schematic diagram of a measuring arrangement measuring transmission properties of a handsfree device.
Figure 2:
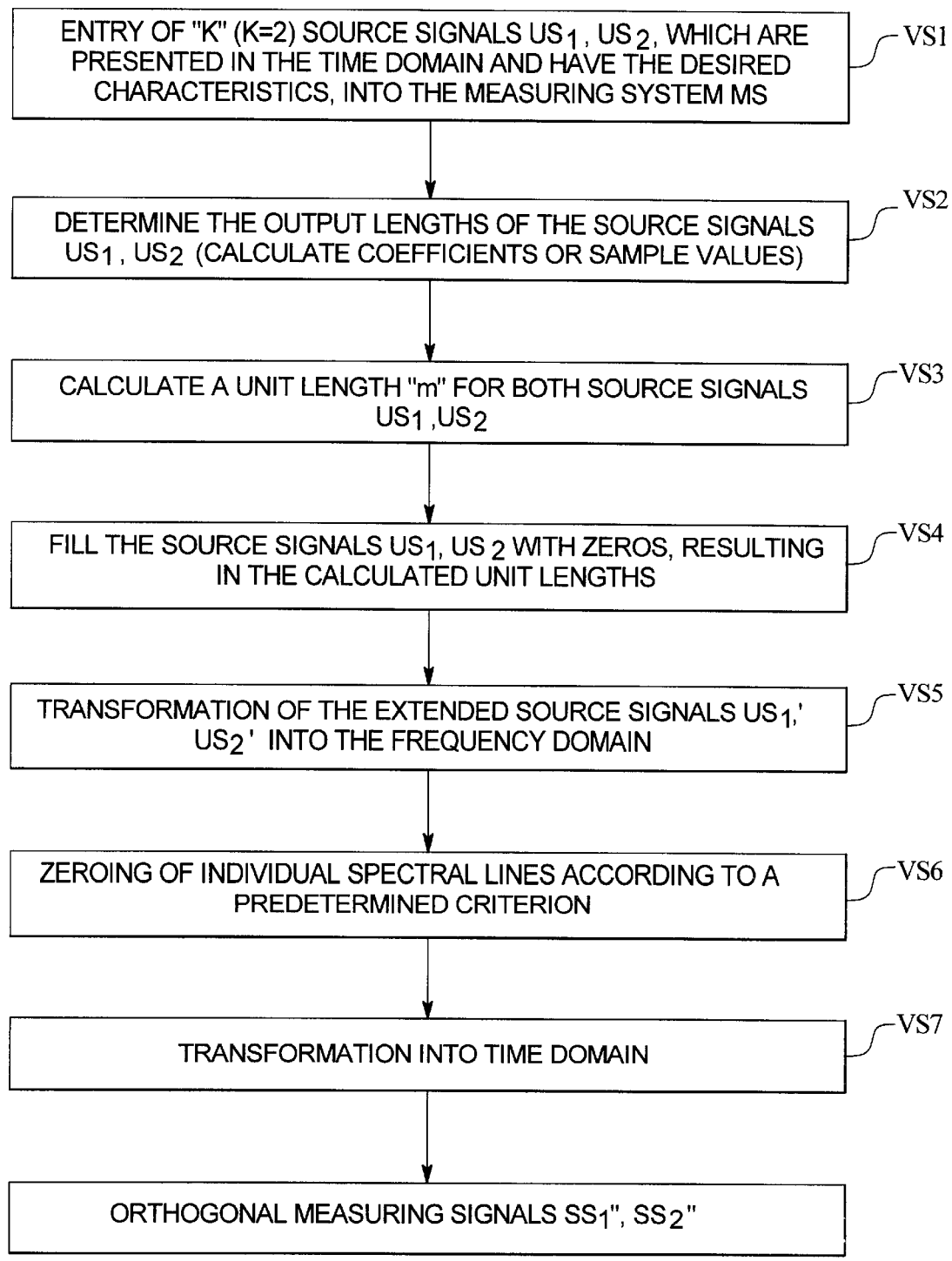
FIG. 2 shows a flowchart for measuring the transmission properties of handsfree devices in accordance with the present invention.

FIG. 2 IS a flowchart for measuring the transmission properties of the handsfree device FSE of FIG. 1, as installed in the measuring system MS of FIG. 1 and used for the measurement. To this end, the measuring system MS preferably comprises known components, which are not shown, such as, for example a microprocessor, a memory, A/D converters, D/A converters and program modules that are connected to one another for measuring the transmission properties of the handsfree device FSE according to the flowchart and correspondingly collaborate.

Figure 3:
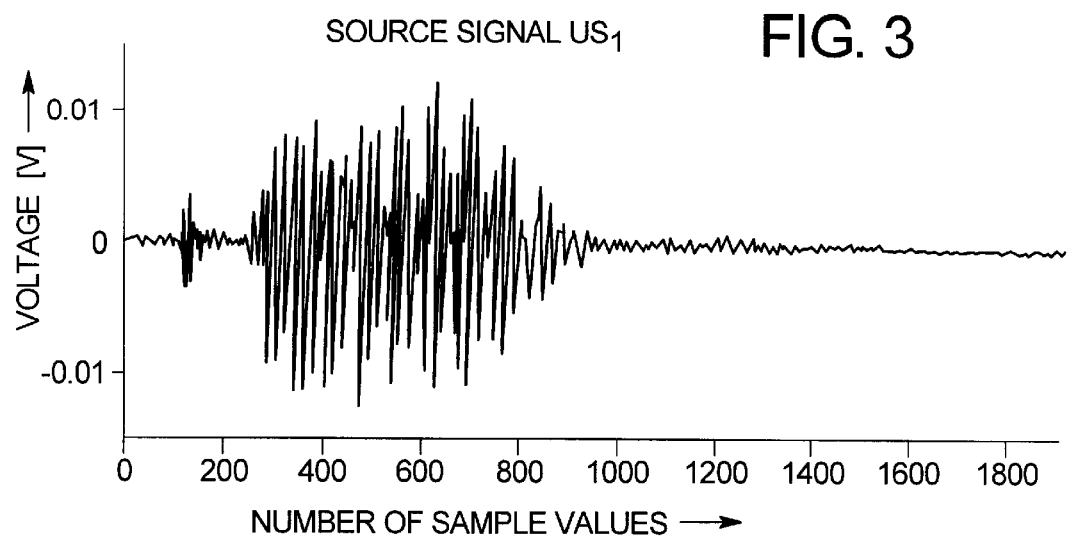
FIGS. 3–11 show graphs of the simulation of the measuring event in the measuring system.
Figure 4:
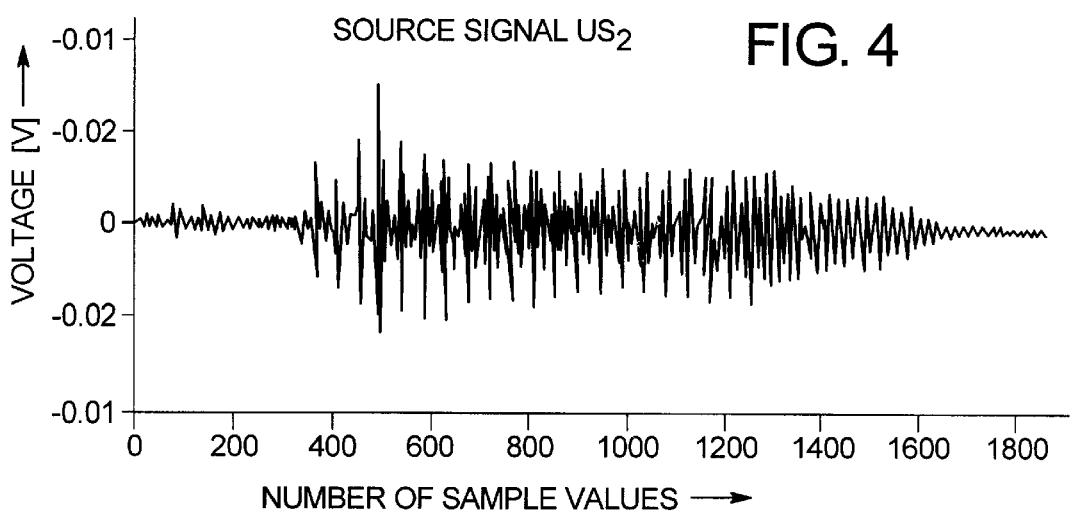

According to the plurality of measuring signals to be generated in conformity with the two transmission signals $SS_1$, $SS_2$ according to FIG. 1, two (k=2) source signals, a first source signal $US_1$ according to FIG. 3 and a second source signal $US_2$ according to FIG. 4 presented, for example, in the time domain are supplied to the measuring system MS or are input into the measuring system MS in a first method step VS1. The plurality "k", however, can also be greater than "2". This case occurs when—differing from the conditions given handsfree calling or given the handsfree device FSE according to FIG. 1 (transmission path and reception path that mutually influence one another due to crosstalk)—the transmission properties of more than two transmission links mutually influencing one another due to crosstalk are to be acquired through measurement. The following remarks apply for k 2.

In a second method step VS2 following thereupon, the respective length of the source signals $US_1$, $US_2$ is identified. To this end, for example, the number of coefficients or samples of the two source signals $US_1$, $US_2$ is respectively determined. Thus, for example:

$$US_1 = \{a_{1_{k-n+1}}, a_{2_{k-n+1}}, a_{3_{k-n+1}} \ldots a_{x_{k-n+1}-1}, a_{x_{k-n+1}}\}$$
$$\Rightarrow \text{with } k = 2 \text{ and } n \in \{2 \ldots k\}$$
$$US_1 = \{a_{1_1}, a_{2_1}, a_{3_1} \ldots a_{x_1-1}, a_{x_1}\}$$
$$\Rightarrow \underline{\text{length of}\quad US_1 = x_1}$$
$$US_2 = \{a_{1_k}, a_{2_k}, a_{3_k} \ldots a_{x_k-1}, a_{x_k}\}$$
$$\Rightarrow \text{with } k = 2$$
$$US_2 = \{a_{1_2}, a_{2_2}, a_{3_2} \ldots a_{x_2-1}, a_{x_2}\}$$
$$\Rightarrow \underline{\text{length of}\quad US_2 = x_2}$$

In a further, third method step VS3, a unit length "m" is calculated for both source signals $US_1$, $US_2$. This calculation ensues according to the equation:

$$m = n'^{*}m' \quad (F1),$$

whereby $n' \in N_0$ and $m' = 2^{ent((ld(max\{x_{k-n+1}, x_k\}))+0.5}$

A new length "m" is obtained with this equation such that, proceeding from the longest source signal, the next-higher $2^n$ value is determined. This is the precondition for a Fast Fourier Transformation (FFT) that is applied in a later method step of the flowchart. Over and above this, the function f(z)=ent(z) supplies the highest whole number that is smaller than or equal to z.

Taking k=2, n'=2 and n $\in \{2 \ldots k\}$ into consideration, this yields the equation:

$$m = 2^{1+ent((ld(max\{x_1, x_2\}))+0.5} \quad (F2)$$

The reason for the selection of n'=2 is that the unit length "m" given an n'2 is so great that an echo (a copy formed from the respective source signal $US_1$, $US_2$) formed from the respective source signal $US_1$, $US_2$ is not convoluted into the signal region of the respective source signal $US_1$, $US_2$. As a result thereof, the source signal is advantageously not influenced in terms of its dynamic properties. When, by contrast, n'=1, then a convolution of the echo or a the copy over the respective source signal occurs.

In a further, fourth method step VS4, the source signals $US_1$, $US_2$ are filled with "0" up to the unit length "m". To that end, a number of "$m-x_1$" zeros are appended immediately following the last sample or coefficient given the first source signal $US_1$, whereas a plurality of "$m-x_2$" zeros is appended directly following the last sample or coefficient given the second source signal $US_2$.

$$US'_1 = \{a_{1_1}, a_{2_1}, a_{3_1} \ldots a_{x_1-1}, a_{x_1}, \underbrace{0, 0, 0, 0 \ldots 0}_{\text{plurality} \quad \text{"}m-x_1\text{"}}\}$$

$$US'_2 = \{a_{1_2}, a_{2_2}, a_{3_2} \ldots a_{x_2-1}, a_{x_2}, \underbrace{0, 0, 0, 0 \ldots 0}_{\text{plurality} \quad \text{"}m-x_2\text{"}}\}$$

Figure 5:
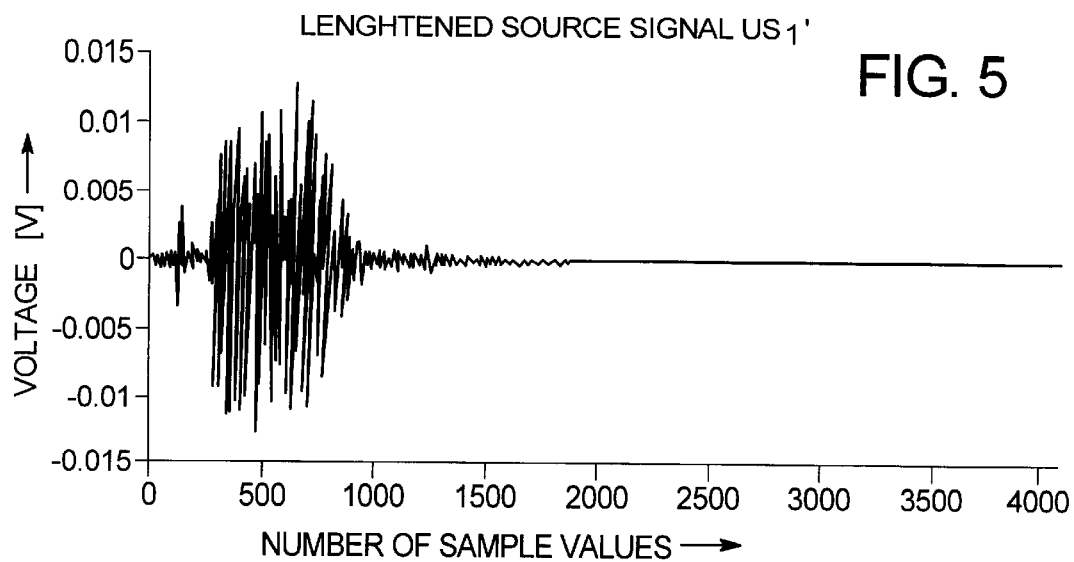
Figure 8:
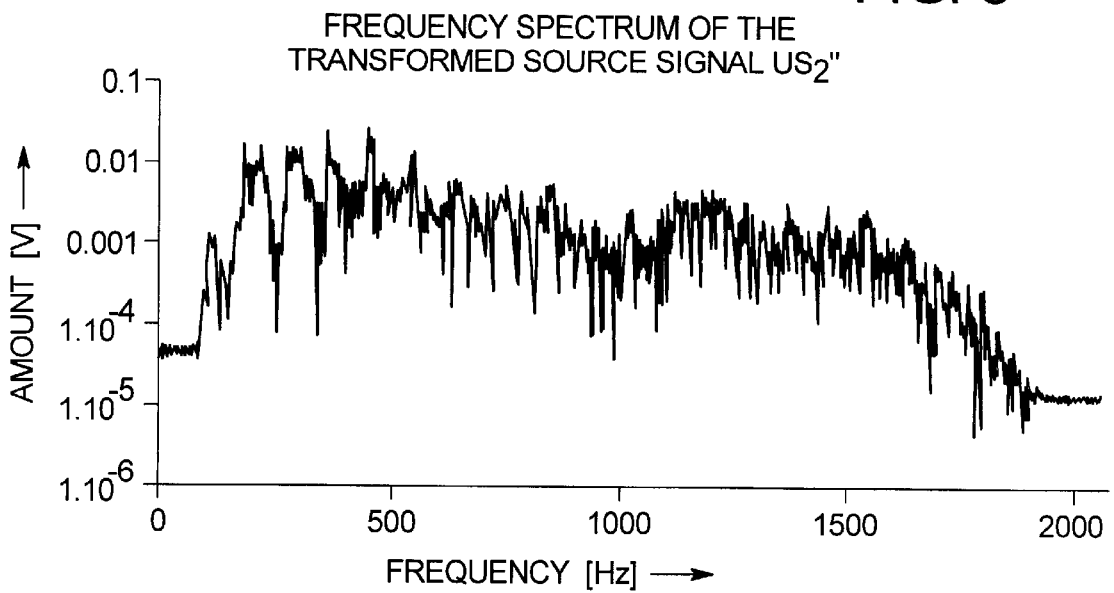

FIG. 5 shows the source signal $US_1'$ lengthened in this way, whereas FIG. 8 shows the source signal $US_2'$ lengthened in this way.

In a further, fifth method step VS5, the lengthened source signals $US_1$, $US_2$ are transformed into the frequency domain in a known way with the aforementioned Fast Fourier Transformation (FFT), and transformed source signals $US_1''$, $US_2''$ are obtained.

$$US_1'' = \{A_{(1_1)}e^{j\Phi_1}, A_{(2_1)}e^{j\Phi_2}, A_{(3_1)}e^{j\Phi_3}, \ldots A_{(u_1)}e^{j\Phi_u}, A_{((u+1)_1)}e^{j\Phi_{u+1}}\},$$

whereby $$u = \frac{m}{2} - 1$$

$$US_2'' = \{A_{(1_2)}e^{j\Phi_1}, A_{(2_2)}e^{j\Phi_2}, A_{(3_2)}e^{j\Phi_3}, \ldots A_{(u_2)}e^{j\Phi_u}, A_{((u+1)_2)}e^{j\Phi_{u+1}}\},$$

whereby $$u = \frac{m}{2} - 1$$

Figure 6:
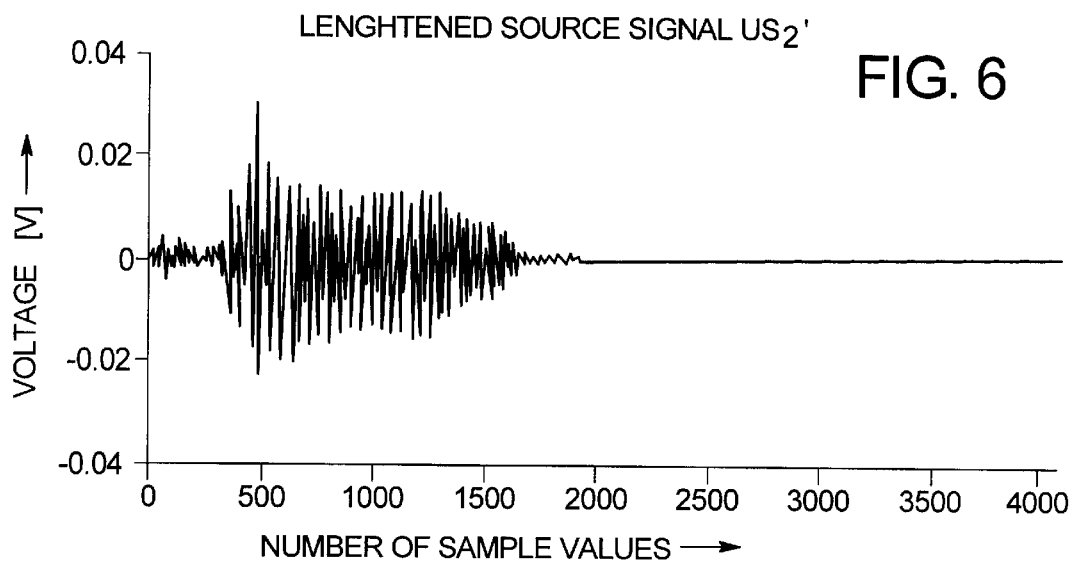
Figure 7:
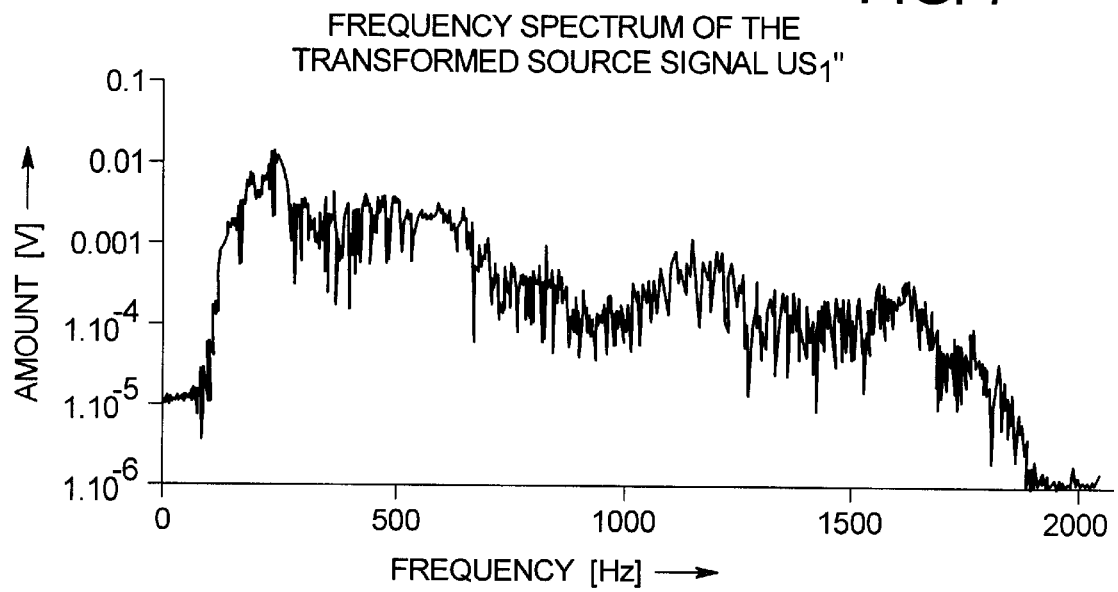

FIG. 7 shows the transformed source signal $US_1''$, whereas FIG. 6 shows the transformed source signal $US_2''$.

In a sixth method step VS6, individual (specific, predetermined) spectral lines of the transformed source signals $US_1''$, $US_2''$ in the frequency domain are multiplied by "0" according to a predetermined criterion, whereas other spectral lines, which obey the same criterion, are multiplied by "1". The determination as to which spectral lines of the transformed source signals $US_1''$, $US_2''$ are multiplied by "0" and which are multiplied by "1" can, for example, ensues on the basis of the following alternance rules:

| First rule: | | | | | | | | | |
|---|---|---|---|---|---|---|---|---|---|
| $US_1''$ | $1_1$ | $0_2$ | $1_3$ | $0_4$ | $1_5$ | . | . | . | 0 m |
| $US_2''$ | $0_1$ | $1_2$ | $0_3$ | $1_4$ | $0_5$ | . | . | . | 1 m |
| Sum | 1 | 1 | 1 | 1 | 1 | 1 | 1 | 1 | 1 |
| Second rule: | | | | | | | | | |
| $US_1''$ | $0_1$ | $1_2$ | $0_3$ | $1_4$ | $0_5$ | . | . | . | 1 m |

-continued

| | | | | | | | | | |
|---|---|---|---|---|---|---|---|---|---|
| $US_2$" | $1_1$ | $0_2$ | $1_3$ | $0_4$ | $1_5$ | . | . | . | 0 m |
| Sum | 1 | 1 | 1 | 1 | 1 | 1 | 1 | 1 | 1 |

Third rule:

| | | | | | | | |
|---|---|---|---|---|---|---|---|
| $US_1$" | $(b0*1)_{1\ldots b0}$ | $(b1*0)_{b0+1}$ ... | $(b2*1)$ ... | $(b3*0)$ ... | $(b4*1)$ ... | . | $(bx*0)$ ... m |
| $US_2$" | $(b0*0)_{1\ldots b0}$ | $(b1*1)_{b0+1}$ ... | $(b2*0)$ ... | $(b3*1)$ ... | $(b4*0)$ ... | . | $(bx*1)$ ... m |
| Sum | $(b0*1)_{1\ldots b0}$ | $(b1*1)_{b0+1}$ ... | $(b2*1)$ ... | $(b3*1)$ ... | $(b4*1)$ ... | . | $(bx*1)$ ... m |

Fourth rule:

| | | | | | | | |
|---|---|---|---|---|---|---|---|
| $US_1$" | $(b0*0)_{1\ldots b0}$ | $(b1*1)_{b0+1}$ ... | $(b2*0)$ ... | $(b3*1)$ ... | $(b4*0)$ ... | . | $(bx*1)$ ... m |
| $US_2$" | $(b0*1)_{1\ldots b0}$ | $(b1*0)_{b0+1}$ ... | $(b2*1)$ ... | $(b3*0)$ ... | $(b4*1)$ ... | . | $(bx*0)$ ... m |
| Summe | $(b0*1)_{1\ldots b0}$ | $(b1*1)_{b0+1}$ ... | $(b2*1)$ ... | $(b3*1)$ ... | $(b4*1)$ ... | . | $(bx*1)$ ... m |

The factors b0 ... bx indicate how many spectral lines are respectively multiplied by "0" or by "1". The factors can thereby all be the same or respectively different. Alternating blocks of identical or different block length thus arise. The block lengths and, thus, the factors are advantageously selected such that they match the frequency resolution of human hearing (Bark scale) or are based on the spectral resolution of sub-band algorithms.

The prescribed criterion is that the respective sum of the "zero" multipliers and "one" multipliers by which the spectral lines of the same frequency or same frequency group are multiplied is equal to "1".

In this way, an orthogonal signal pair $SS_1$', $SS_2$' that is presented in the frequency domain is acquired from the transformed source signals $US_1$", $US_2$". Given application of rule 1, the following Fourier values derive for the signal pair $SS_1$', $SS_2$':

$$SS_1' = \{A_{(1_1)}e^{j\Phi_1}, 0, A_{(3_1)}e^{j\Phi_3}, \ldots A_{(u_1)}e^{j\Phi_u}, 0\},$$

$$SS_2' = \{0, A_{(2_2)}e^{j\Phi_2}, 0, \ldots 0, A_{((u+1)_2)}e^{j\Phi_{u+1}}\},$$

Figure 9:
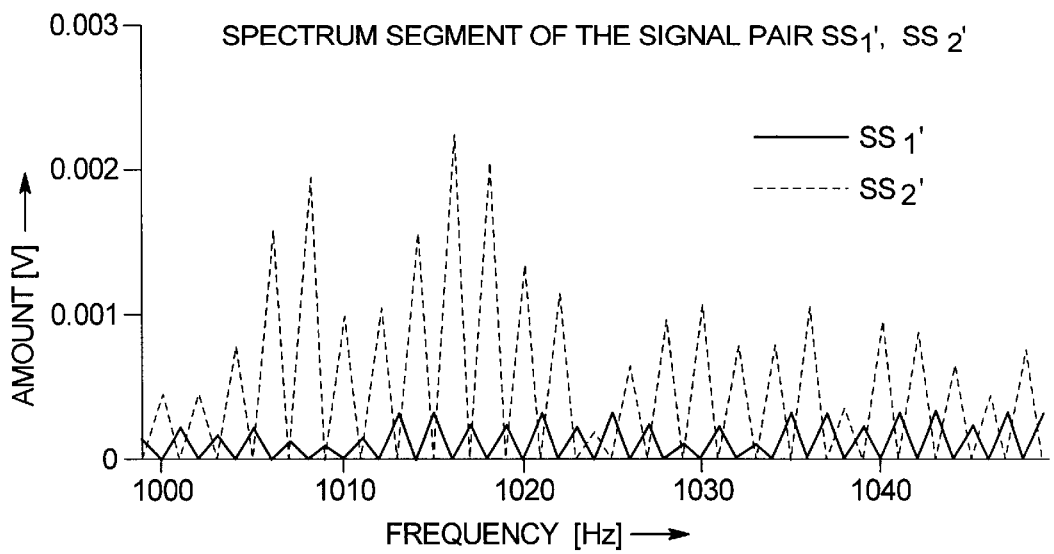

FIG. 9 shows the spectra of the orthogonal signal pair $SS_1$', $SS_2$' for a small frequency segment.

Figure 10:
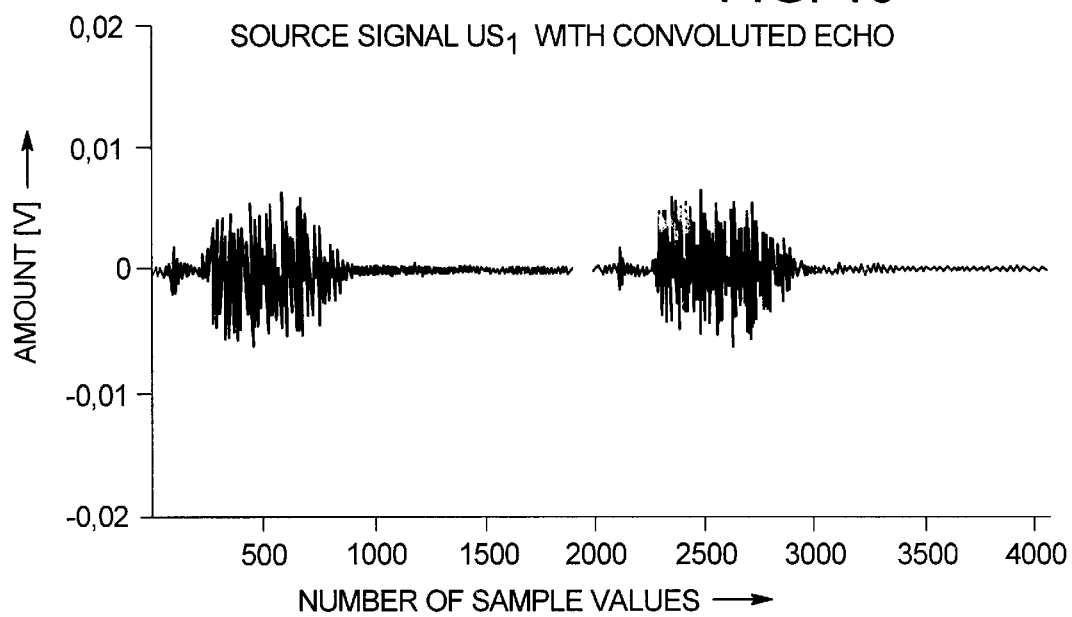
Figure 11:
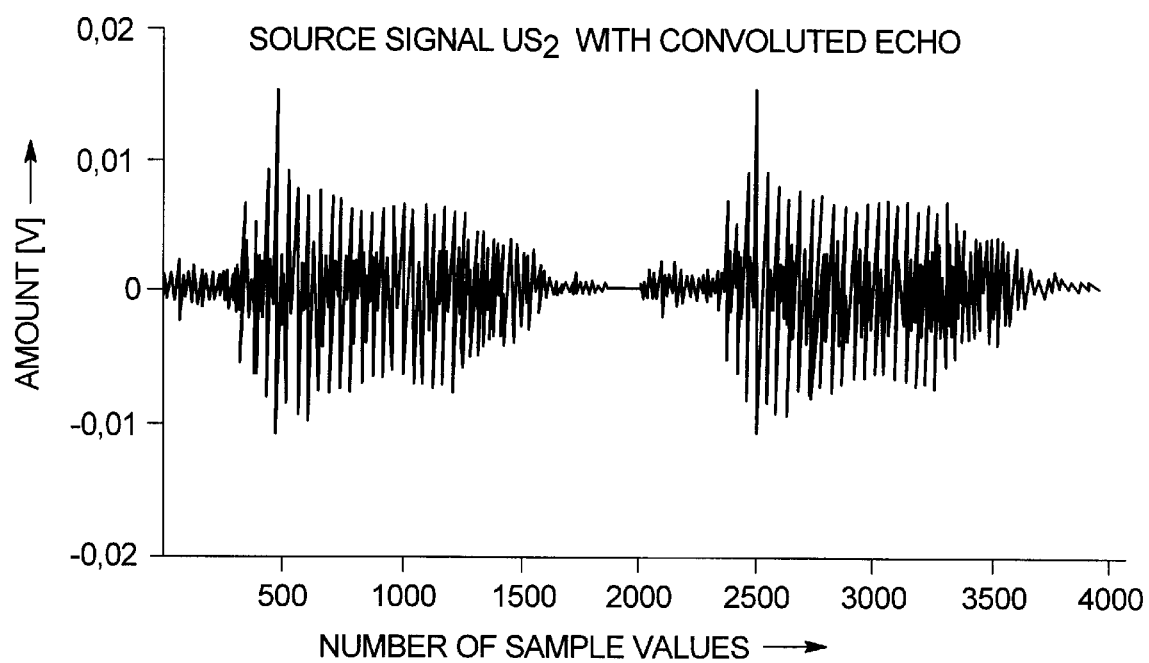

In a final, seventh method step VS7, the orthogonal signal pair $SS_1$', $SS_2$', presented in the frequency domain is transformed into the time domain. As a result of this transformation, one finally obtains orthogonal measured signals $SS_1$", $SS_2$" that, like the measured signal $SS_1$, $SS_2$ of FIG. 1, can be employed for measuring the transmission properties of the handsfree device FSE. The orthogonal measured signal $SS_1$" is shown in FIG. 10, whereas the orthogonal measured signal $SS_2$" is shown in FIG. 11. It can be seen in FIG. 10 that the orthogonal measured signal $SS_1$' is the source signal $US_1$ with an echo convoluted outside the source signal $US_1$. The same is true of the orthogonal measured signal $SS_2$", which is formed from the source signal $US_2$ with an echo convoluted outside the source signal $US_2$.

Generating the orthogonal measured signals $SS_1$", $SS_2$" from the source signals $US_1$, $US_2$ can also ensue directly in the time domain, i.e. without a transformation from the time domain into the frequency domain and a back-transformation from the frequency domain into the time domain. Method steps VS5 and VS7 are thus omitted.

The orthogonal measured signals $SS_1$", $SS_2$" are obtained in the following way:

1. Generating a copy of the first source signal $US_1$ and of the second source signal $US_2$.
2. Attaching the copy behind the respective source signal $US_1$, $US_2$.
3. Inverting the signal parts of the copy of the first source signal $US_1$ and non-modification of the signal parts of the copy of the second source signal $US_2$. Arising according to FIG. 10 is a signal composed of the first source signal $US_1$ and an "echo" with inverted operational sign, and, according to FIG. 11, a signal composed of the second source signal $US_2$ and an "echo" with the proper operational sign.

When the measuring signals $SS_1$", $SS_2$" are employed when measuring the transmission properties of the handsfree device FSE in the measuring system MS according to FIG. 1, then corresponding reception signals $ES_1$", $ES_2$" are obtained. These reception signals $ES_1$", $ES_2$" are processed in the measuring system MS in exactly the same way as the source signals $US_1$, $US_2$ (flowchart according to FIG. 2). In this way, signal parts produced by crosstalk can be eliminated.

Although the present invention has been described with reference to specific embodiments, those of skill in the art will recognize that changes may be made thereto without departing from the spirit and scope of the present invention as set forth in the hereafter appended claims.

What is claimed is:

1. A method for generating measuring signals for measuring transmission properties of transmission links mutually influencing one another with crosstalk in a telecommunications system, comprising the steps of:

generating a plurality k of source signals s;

defining a $(k-n+1)^{th}$ source signal length $x_{k-n+1}$ of a $(k-n+1)^{th}$ source signal $s_{k-n+1}$ with $x_{k-n+1}$ signal parts $$a_{1_{k-n+1}}, a_{2_{k-n+1}}, a_{3_{k-n+1}} \ldots a_{x_{k-n+1}-1}, a_{x_{k-n+1}},$$

said source signal length x being x 0, and said coefficient n being n{2 ... k};

defining a $k^{th}$ source signal length $x^k$ of a $k^{th}$ source signal $s_k$ with $x^k$ signal parts $$a_{1_k}, a_{2_k}, a_{3_k} \ldots a_{x_k-1}, a_{x_k};$$

calculating a measuring signal length m as m=n'm', said n being n' 0 and said m' being $m' = 2^{ent((ld(max\{x_{k-n+1}, x_k\}))+0.5)}$;

lengthening said $(k-n+1)^{th}$ source signal $s_{k-n+1}$ to said measuring signal length m by attaching $m-x_{k-n+1}$ zeros to an end of said $(k-n+1)^{th}$ source signal $s_{k-n+1}$;

lengthening said $k^{th}$ source signal $s_k$ to said measuring signal length m by attaching $m-x_k$ zeros to an end of said $k^{th}$ source signal $s_k$; and modifying said lengthened $(k-n+1)^{th}$ source signal $s_{k-n+1}$, and said lengthened $k^{th}$ source signal $s_k$ such that said $(k-n+1)^{th}$ source signal $s_{k-n+1}$ and said $k^{th}$ source signal $s_k$ being essentially orthogonal.

2. The method according to claim 1, wherein said $(k-n+1)^{th}$ source signal $s_{k-n+1}$, and said $k^{th}$ source signal $s_k$ having an orthogonality relationship $|(s_{k-n+1}, s_k)| << |s_{k-n+1}|$ and $|(s_{k-n+1}, s_k)| << |s_k|$.

3. The method according to claim 1, further comprising the steps of:

generating spectral lines of said lengthened $(k-n+1)^{th}$ source signals $s_{k-n+1}$ and said $k^{th}$ source signals $s_k$ by transforming said $(k-n+1)^{th}$ source signals $s_{k-n+1}$ into a frequency domain;

multiplying said spectral lines by zero and one in alternation and alternatively in alternation by blocks such that a sum of said zero multipliers and one multipliers by which said spectral lines of a same frequency and alternatively same frequency group are multiplied is equal to 1; and transforming said $(k-n+1)^{th}$ source signals $s_{k-n+1}$ and said $k^{th}$ source signals $s_k$ modified with respect to said spectral lines into a time domain.

4. The method according to claim 3, wherein said alternating blocks of said spectral lines at least have a uniform length.

5. The method according to claim 1, wherein said step of generating a plurality k of source signals further comprises generating two (k=2) source signals, a first source signal $S_1$ and a second source signal $S_2$; and further comprising the steps of:

generating a first copy of said first source signal $S_1$ and a second copy of said second source signal $S_2$;

attaching said generated first copy behind said first source signal $S_1$ and said generated second copy behind said second source signal $S_2$; and inverting said signal parts of one of said first and second copies.

6. The method according to claim 5, wherein said calculated measuring signal length m being equal to 2m' (n'=2).

7. A device for measuring transmission properties of transmission links mutually influencing one another with crosstalk in a telecommunications system, comprising:

a measuring system for generating measuring signals, said measuring signals being generated by:

generating a plurality k of source signals s;

defining a $(k-n+1)^{th}$ source signal length $x_{k-n+1}$ of a $(k-n+1)^{th}$ source signal $s_{k-n+1}$ with $x_{k-n+1}$ signal parts $$a_{1_{k-n+1}}, a_{2_{k-n+1}}, a_{3_{k-n+1}} \ldots a_{x_{k-n+1}-1}, a_{x_{k-n+1}},$$

said source signal length x being x< >0, and said coefficient n being n{2 ... k};

defining a $k^{th}$ source signal length $x_k$ of a $k^{th}$ source signal $s_k$ with $x_k$ signal parts $$a_{1_k}, a_{2_k}, a_{3_k} \ldots a_{x_k-1}, a_{x_k};$$

calculating a measuring signal length m as m=n'm', said n being n' 0 and said m' being $m'=2^{ent((ld(max\{x_{k-n+1}, x_k\}))+0.5)}$ lengthening said $(k-n+1)^{th}$ source signal $s_{k-n+1}$ to said measuring signal length m by attaching $m-x_{k-n+1}$ zeros to an end of said $(k-n+1)^{th}$ source signal $s_{k-n+1}$;

lengthening said $k^{th}$ source signal $s_k$ to said measuring signal length m by attaching $m-x_k$ zeros to an end of said $k^{th}$ source signal $s_k$; and modifying said lengthened $(k-n+1)^{th}$ source signal $s_{k-n+1}$ and said lengthened $k^{th}$ source signal $s_k$ such that said $(k-n+1)^{th}$ source signal $s_{k-n+1}$ and said $k^{th}$ source signal $s_k$ being essentially orthogonal.

* * * * *